(12) United States Patent
Kong et al.

(10) Patent No.: US 8,487,263 B2
(45) Date of Patent: Jul. 16, 2013

(54) APPARATUS FOR DETECTING RADIOACTIVITY OF INTERNAL PARTS AND EXTERNAL PARTS OF WHOLE BODY

(75) Inventors: Tae Young Kong, Daejeon (KR); Hee Geun Kim, Daejeon (KR)

(73) Assignee: Korea Hydro & Nuclear Power Co., Ltd., Seoul (KR)

( * ) Notice: Subject to any disclaimer, the term of this patent is extended or adjusted under 35 U.S.C. 154(b) by 322 days.

(21) Appl. No.: 12/889,245

(22) Filed: Sep. 23, 2010

(65) Prior Publication Data
US 2011/0073761 A1 Mar. 31, 2011

(30) Foreign Application Priority Data
Sep. 25, 2009 (KR) .................. 10-2009-0091176

(51) Int. Cl.
*G01T 1/00* (2006.01)
*G01T 1/167* (2006.01)

(52) U.S. Cl.
USPC ............ 250/358.1; 250/336.1; 340/600; 378/57

(58) Field of Classification Search
USPC ............ 250/358.1, 363.02, 370.06, 336.1, 250/370.07, 394; 702/188; 600/431, 436; 340/600
See application file for complete search history.

(56) References Cited

U.S. PATENT DOCUMENTS
5,679,956 A * 10/1997 Johnston ............... 250/357.1
2006/0284094 A1* 12/2006 Inbar .................... 250/359.1

FOREIGN PATENT DOCUMENTS
JP 60-070386 4/1985
JP 2005-049137 2/2005

* cited by examiner

*Primary Examiner* — David Porta
*Assistant Examiner* — Yara Green
(74) *Attorney, Agent, or Firm* — Edwards Wildman Palmer LLP

(57) ABSTRACT

A method and apparatus for detecting radioactivity of a whole body is disclosed. The apparatus for detecting radioactivity of a whole body is divided into upper and lower parts, the upper and lower parts are divided into front, rear, left and right portions, respectively, a radioactivity detection unit is installed at each of the front, rear, left and right portions, radioactivity values detected by each of the radioactivity detection units are compared and analyzed such that radioactivity values detected by the radioactivity detection units positioned at upper front and rear parts are compared, radioactivity values detected by the radioactivity detection units positioned at upper left and right parts are compared, and also radioactivity values detected by the lower radioactivity detection units are compared in the same manner, thus determining whether or not the internal parts or external parts of the body of a detection target have been contaminated by radioactivity.

5 Claims, 2 Drawing Sheets

APPARATUS FOR DETECTING RADIOACTIVITY OF INTERNAL PARTS AND EXTERNAL PARTS OF WHOLE BODY

BACKGROUND OF THE INVENTION

1. Field of the Invention

The present invention relates to an apparatus for detecting radioactivity of a whole body, which is divided into upper and lower parts, the upper and lower parts are divided into front, rear, left and right portions, respectively, a radioactivity detection unit is installed at each of the front, rear, left and right portions, radioactivity values detected by each of the radioactivity detection units are compared and analyzed such that radioactivity values detected by the radioactivity detection units positioned at upper front and rear parts are compared, radioactivity values detected by the radioactivity detection units positioned at upper left and right parts are compared, and radioactivity values detected by the lower radioactivity detection units are compared in the same manner, thus determining whether or not the internal parts or external parts of the body of a detection target have been contaminated by radioactivity.

2. Description of the Related Art

In general, a radioactive material is put on the external surface of a person who works in a radioactivity-related industry (hereinafter, referred to as a 'practician'), the radioactive material is relatively closer to a radioactivity detection unit than a radioactive material positioned in the body, and because a radioactivity detection value is reduced such that it is in inverse proportion to the square of the distance, the radioactivity value detected at the closer position is obtained to be even higher.

In addition, the radioactive material present in the body is shielded by the body, while the radioactive material put on the outer side of the body has a higher radioactivity value without any shielding effect.

The related art apparatus for detecting radioactivity of a whole body is to detect gamma rays emitted from the radioactive material deposited in the practician's body. As shown in FIG. 1, the related art apparatus for detecting radioactivity of a whole body 101 includes one or two radioactivity detection units 102 a/b (upper/lower) to be installed at front or rear parts of the detection target, having a problem in that it cannot properly determine whether or not the internal parts or external parts of the radioactivity work practician have been contaminated by radioactivity.

Japanese Laid Open Publication Nos. 60-70386 and 2005-049137 disclose a technical constitution of a radioactivity detection apparatus, in which, however, only a front or rear part of a body is detected in one direction to simply determine a contamination degree of radioactivity and whether or not the body has been contaminated, having a problem in that gamma rays emitted from a radioactive material deposited in the body of the radioactivity work practician and gamma rays emitted from a radioactive material put on the external surface of the body of the practician cannot be discriminated.

SUMMARY OF THE INVENTION

Therefore, an object of the present invention is to recognize whether or not the internal parts or external parts of the body of a detection target have been contaminated by radioactivity by using the characteristics that external radioactive material is detected to have a higher value than that of an internal radioactive material because the radioactive material put on the external surface of the body is closer to a radioactivity detection unit than the radioactive material present in the body is, does not have a shielding effect by an internal material, and its detected radioactivity value is reduced to be inverse proportional to the square of the distance.

Another object of the present invention is to install radioactivity detection units at front, rear, left and right portions of upper and lower parts of a radioactivity whole body detection apparatus to detect radioactivity simultaneously or separately and compare detected radioactivity values such that values detected from upper front and rear parts are compared, values detected from upper left and right parts are compared, and also values detected by lower radioactivity detection units are compared in the same manner, to thus easily recognize whether or not the internal parts or external parts of the body of a detection target have been contaminated by radioactivity.

Another object of the present invention is to set a value stored in a memory for determining a radioactivity contamination of the internal parts or external parts of a body in a case in which a ratio according to the difference in a radioactivity detection value of a comparison target is 1.5 times or greater, and when a radioactivity detection value of a comparison target is greater than the set value, it is determined that the external parts of the body of the comparison target have been contaminated.

Another object of the present invention is to determine that the external parts of a body have been contaminated when two values are generated due to the difference in distance of the front, rear, left and right portions of the body based on radioactivity values detected by detection units installed at front, rear, left, and right portions of the upper and lower parts of an apparatus for detecting radioactivity of a whole body and detected positions, and precisely display the measured radioactivity values and detection positions on a display unit of the radioactivity whole body detection apparatus, to allow a detection target to easily separate and remove the contaminated radioactive material.

In order to achieve the above objects, there is provided an apparatus for detecting radioactivity of the internal parts and external parts of a whole body, which is divided into upper and lower parts, the upper and lower parts are divided into front, rear, left and right portions, respectively, a radioactivity detection unit is installed at each of the front, rear, left and right portions, radioactivity values detected by each of the radioactivity detection units are compared and analyzed such that radioactivity values detected by the radioactivity detection units positioned at upper front and rear portions are compared, radioactivity values detected by the radioactivity detection units positioned at upper left and right portions are compared, and also radioactivity values detected by the lower radioactivity detection units are compared in the same manner, thus determining whether or not the internal parts or external parts of the detection target's body have been contaminated by radioactivity.

In order to achieve the above objects, there is provided an apparatus for detecting radioactivity of the internal parts and external parts of a whole body, which includes a unit for inputting bodily conditions of a radioactivity detection target based on the fact that a radioactivity detection value is reduced to be inverse proportion to the square of the distance, determines that the external parts of a body have been contaminated when a radio obtained by comparing radioactivity values among radioactivity values simultaneously or separately detected by radioactivity detection units installed at front, rear, left and right portions of upper and lower parts has a difference by 1.5 times or greater, and determines that the internal parts of the body have been contaminated when the ratio is lower than 1.5.

In order to achieve the above objects, there is provided an apparatus for detecting radioactivity of the internal parts and external parts of a whole body, whereby bodily conditions such as the chest size, waist measurement, hip size, and the like, of a radioactivity detection target are inputted, and when the difference between two values based on radioactivity values detected simultaneously or separately by detection units installed at front, rear, left, and right portions of upper and lower parts and detected positions is determined to be a value generated by the difference in distances of the front, rear, left, and right portions of the body, it is determined that the external parts of the body have been contaminated and the detected radioactivity values and the contaminated positions are precisely displayed on a display unit.

In order to achieve the above objects, there is provided an apparatus for detecting radioactivity of a whole body, whereby when it is determined that the internal parts of the body have been contaminated based on a set value 1.5 stored in a memory, mutually corresponding comparison target radioactivity values are added up and then averaged to thereby preciously detect the radioactivity values and the detected positions and display the same on a display unit.

The foregoing and other objects, features, aspects and advantages of the present invention will become more apparent from the following detailed description of the present invention when taken in conjunction with the accompanying drawings.

DETAILED DESCRIPTION OF THE INVENTION

Exemplary embodiment of the present invention will now be described. An apparatus for detecting radioactivity of a whole body according to an exemplary embodiment of the present invention is divided into upper and lower parts, the upper and lower parts are divided into front, rear, left and right portions, respectively, a radioactivity detection unit is installed at each of the front, rear, left and right portions, the entrance is installed at one of four corners or one face may be designed to be opened and closed.

An apparatus for detecting radioactivity of a whole body according to an exemplary embodiment of the present invention includes a memory having a program for storing radioactivity values detected by radioactivity detection units, comparing and analyzing corresponding values such that radioactivity values of front and rear portions of a detection target detected by the radioactivity detection units positioned at upper part are compared, radioactivity values of left and right portions of the detection target detected by the radioactivity detection units positioned at upper part are compared, thereby determining whether or not the internal parts and external parts of the body of the radioactivity detection target have been contaminated by radioactivity.

Also, the memory having a program for comparing radioactive detection values by the lower radioactivity detection units in the same manner in order to determine whether or not the internal parts or external parts of the radioactivity detection target's body have been contaminated by radioactivity.

Figure 1:
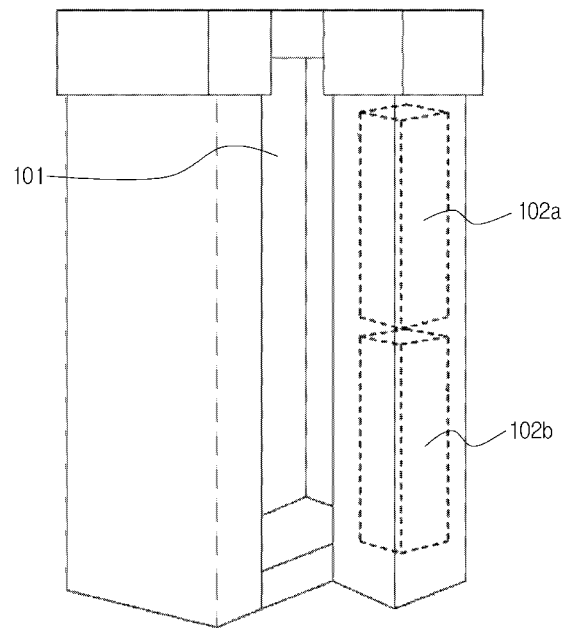
FIG. 1 is a schematic perspective view of the related art apparatus for detecting radioactivity contamination of a whole body of a radioactivity work practician.
Figure 2:
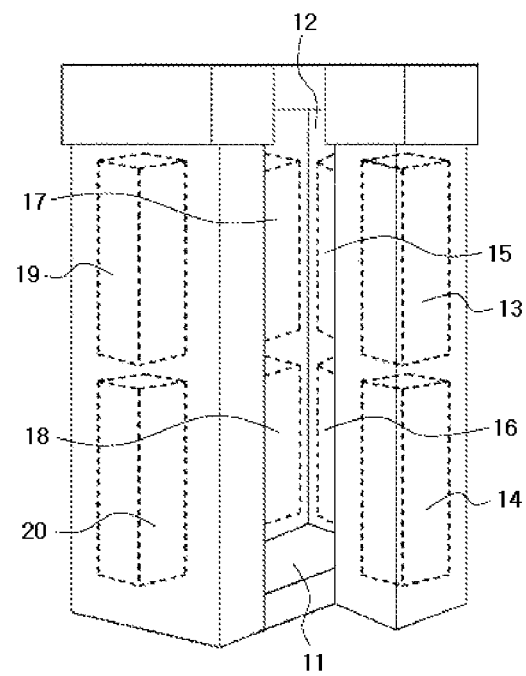
FIG. 2 is a schematic perspective view of an apparatus for detecting radioactivity of the internal parts and external parts of a whole body to check whether or not a detection target has been contaminated by a radioactive material according to an exemplary embodiment of the present invention.

The exemplary embodiments of the present invention will now be described. FIG. 2 illustrates the apparatus for detecting radioactivity of the internal parts and external parts of a whole body to check whether or not a detection target has been contaminated by a radioactive material according to an exemplary embodiment of the present invention.

As shown in FIG. 2, in the radioactivity whole body detection apparatus 12 according to an exemplary embodiment of the present invention, radioactivity detection units are installed at upper and lower parts. That is, the radioactivity detection units are installed on a front portion 13, a rear portion 17, a left portion 19, and a right portion 15 of the upper part, and also installed on a front portion 14, a rear portion 18, a left portion 20, and a right portion 16.

In FIG. 2, the entrance 11 may be formed at one corner or at one side of the radioactivity whole body detection apparatus to allow detection targets to come in and out, or a door may be designed to be fabricated to open and close one of four sides of the radioactivity whole body detection apparatus.

The radioactivity whole body detection apparatus according to an exemplary embodiment of the present invention is divided into upper and lower parts, and in this case, although there is a certain space between the upper and lower parts, radioactivity emitted from a radioactive material present in the internal parts and/or external parts of the body of the detection target is radiated in every direction, so a radioactivity value and contamination position can be precisely detected by the radioactivity detection units positioned at the upper and/or lower parts in a facing manner.

Preferably, the plurality of radioactivity detection units are installed at the upper and lower parts, but a single longer radioactivity detection unit may be installed in a vertical direction.

The radioactivity whole body detection apparatus may be designed and fabricated in a shape selected from a quadrangular shape, a circular shape, and any mixture thereof, or in various other shapes, with the radioactivity detection units installed on the front portions 13 and 14 and the rear portions 17 and 18 and on the left portions 19 and 20 and the right portions 15 and 16 of the upper and lower parts of the radioactivity whole body detection apparatus.

The radioactivity whole body detection apparatus according to an exemplary embodiment of the present invention has a program for storing radioactivity detection values simultaneously or separately detected by the plurality of radioactivity detection units in a database or a memory, comparing data detected from the mutually corresponding portions based on the stored data, and determining an external radioactivity contamination when the rate according to the difference is greater than a value set in the memory.

As for the mutually corresponding portions to be compared to determine whether or not the internal parts and external parts of the body of the radioactivity detection target to have been contaminated by radioactivity, the radioactivity values detected from the front portion 13 and the rear portion 17 of the radioactivity detection units positioned at the upper part are compared, and radioactivity values detected from the left portion 19 and the right portion 15 are compared.

Also, the radioactivity detection units positioned at the lower part of the radioactivity whole body detection apparatus compares radioactivity values detected from the front portion 14 and the rear portion 18 and compares radioactivity values detected from the left portion 20 and the right portion 16.

The program included in the radioactivity whole body detection apparatus according to an exemplary embodiment of the present invention includes a means for detecting a radioactivity contamination degree based on the respective data detected by the respective radioactivity detection units, a means for comparing rates of the radioactivity values of the corresponding portions, adding the detected data, dividing the added data, and averaging the same to thereby obtain a precise radioactivity value and determine a precise position, when it is determined as the internal radioactivity contamination, and a means for inputting bodily conditions of the detection target and precisely determining an external or internal contamination.

The technical constitution of the radioactivity whole body detection apparatus will now be described in detail.

First, in order to prevent nearby gamma rays, or the like, natural radial rays, from being introduced into the radioactivity whole body detection apparatus, the radioactivity detection units may be made of iron or a material for interrupting introduction of gamma rays to shield the outer side of the radioactivity detection units.

The radioactivity whole body detection apparatus according to an exemplary embodiment of the present invention converts radioactivity emitted from the detection to target into an electrical signal through an interaction with a sensor installed in the radioactivity detection unit to detect the radioactivity, and when the detected radioactivity value is high, it indicates that a contamination degree is high, and when the radioactivity value is low, it indicates that a contamination degree is low.

In an exemplary embodiment of the present invention, radioactivity contamination of the internal parts or external parts of the body of the detection target is recognized by using the characteristics that the radioactivity detection value is reduced in inverse proportion to the square of the distance and when a radioactive material exists outside the body of the practician, it has a higher value than the case in which the radioactivity exists in the body, because there is no shielding effect with respect to the radioactive material existing at the outside the body.

Among the radioactivity values detected simultaneously or separately by the radioactivity detection units installed at the front, rear, left, and right portions of the upper part of the radioactivity whole body detection apparatus, the values detected from the facing front and rear portions by the upper radioactivity detection units are compared, and the values detected from the left and right portions by the upper detection units are compared.

Also, the values detected from the facing front and rear portions by the lower radioactivity detection units of the radioactivity whole body detection apparatus are compared, and values detected from the left and right portions by the upper detection units are compared in the same manner.

When the ratio according to the difference between the compared radioactivity values is 1.5 times or greater, the body part is determined to be externally contaminated. The definition of the rate will be described later.

The rate 1.5 is set and stored in the memory, which can be changed to be inputted in consideration of the accuracy, reliability, and the like, of the detection units of the radioactivity whole body detection apparatus.

In order to determine whether or not the internal parts or external parts of the body have been contaminated by radioactivity at the ratio according to the difference between the radioactivity values, preferably, the set value stored in the memory range from 1.7 to 2.3.

In the radioactivity whole body detection apparatus according to an exemplary embodiment of the present invention, the bodily conditions of the chest size, waist measurement, and hip size of the radioactivity detection target are inputted, and when the difference between two values based on radioactivity values detected simultaneously or separately by detection units installed at the front, rear, left, and right portions of upper and lower parts is determined to be a value generated by the difference in front, rear, left, and right distances according to the bodily conditions, it is determined that the external parts of the body have been contaminated by radioactivity.

When the difference between the radioactivity values detected by the radioactivity detection units positioned to face each other is determined to result from the distance generated due to the size of the chest, waist, hip, and the like, the bodily conditions inputted by the detection target, it is determined that the external parts of the body have been contaminated by radioactivity.

In case of determining whether or not the external parts of the body have been contaminated by radioactivity, because the radioactivity values detected according to the bodily conditions such as the chest size, waist measurement, hip size, and the like, of the detection target differ greatly, so more precise data and determination results can be obtained by inputting them.

The setting of the difference in the distance according to the chest size, waist measurement, hip size, and the like, of the detection target and the data such as radioactivity values according to the distances are obtained through numerous repeated experimentation by using a humanoid phantom and stored in a database or memory of the radioactivity whole body detection apparatus.

When it is determined that the external parts of the body has been simply contaminated by radioactivity, the detected radioactivity value and the detected portion are indicated as a human body model and/or numerical values on a display unit of the radioactivity whole body detection apparatus, so that the radioactivity according to the contamination of the external parts of the body can be easily removed.

Also, in an exemplary embodiment of the present invention, when it is determined that the internal parts of the body has been simply contaminated by radioactivity, in order to precisely detect radioactivity values, radioactivity values are compared and added, and the added value is averaged to be used, whereby the radioactivity contamination degree and detection position can be more accurately detected.

In the radioactivity whole body detection apparatus according to an exemplary embodiment of the present invention, data and means required for the present invention such as a means for setting radioactivity values by the difference in distances according to the chest size, waist measurement, hip size, and the like, of the detection target and precisely obtaining a contamination degree by using radioactivity values according to distances, set values for determining whether or not the internal parts or external parts of the body have been contaminated by radioactivity, and the radioactivity values detected from the mutually corresponding portions are obtained through numerous repeated experimentation by using a humanoid phantom and stored in the database or memory so as to be used.

The humanoid phantom used in an exemplary embodiment of the present invention is designed and fabricated by Radioactivity Health Institute to Korea Hydro & Nuclear Power Co., Ltd. to meet the standards defined by International Commission on Radiological Protection (ICRP), and configured as a slice of 2-cm interval.

A method for obtaining data for determining whether or not the internal parts or external parts of the body of the detection target have been contaminated by radioactivity will now be described.

Figure 3:
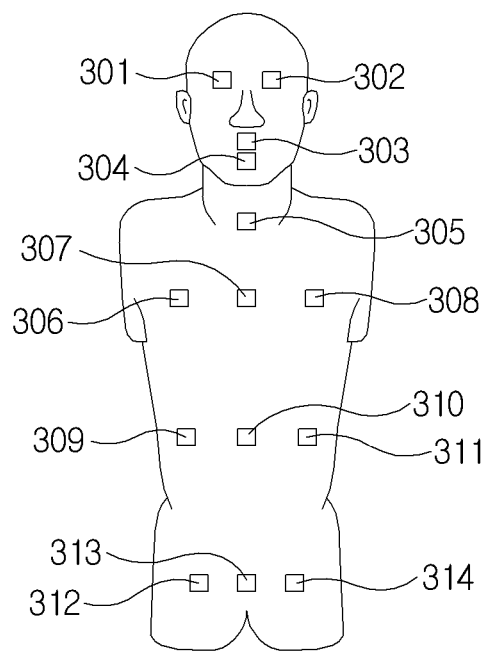
FIGS. 3 and 4 are front and rear views of a source-attached humanoid phantom.
Figure 4:
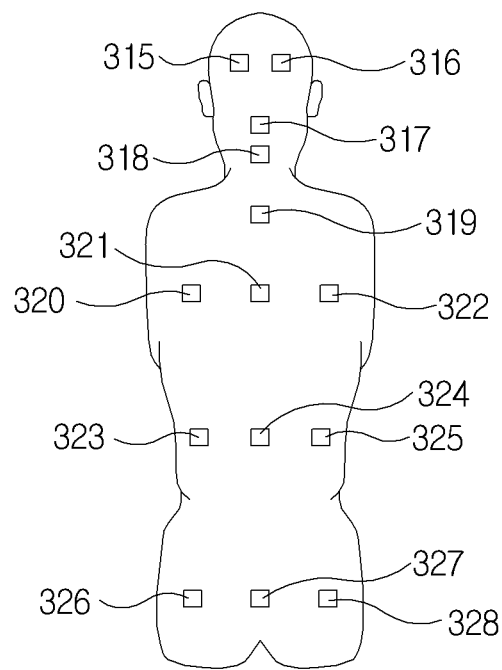

As shown in FIGS. 3 and 4, on the assumption that the external parts of the body of the detection target have been contaminated by radioactivity, radioactivity contamination positions are marked with numbers 301~314 on the front side of the humanoid phantom to install mixture sources, and radioactivity contamination positions are marked with numbers 315~328 on the rear side of the humanoid phantom to install mixture sources, to detect front and rear radioactivity of the humanoid phantom.

In addition, on the assumption that the internal parts of the body of the detection target have been contaminated by radioactivity, a point source positioned within a contamination position indication slice is inserted into the humanoid phantom, and radioactivity is detected at the front and rear sides.

A rate generated by the difference between the front and rear radioactivity detection values with respect to the internal or external parts radioactivity contamination is calculated and determined.

Radiation sources used for experimentation were Cobalt-60 and Cesium-137, which were used as mixture sources and/or a point source.

The rate of the front and rear radioactivity detection values used in an exemplary embodiment of the present invention is defined as a value obtained by a maximum value of the front and rear radioactivity detection values by a minimum value of the front and rear radioactivity detection values.

The rate of the radioactivity detection values detected from the front and rear portions of the upper and lower parts of the radioactivity whole body detection apparatus may be obtained by using an average value measured several times in order to increase the accuracy.

The experimentation results of the radioactivity contamination of the external parts of the body are as shown in Table 1. In Table 1, when the radiation source was Cobalt-60, the average of the defined rate was 7.9±1.1, and when the radiation source was Cesium-137, the average of the defined rate was 12.8±1.7.

The front side among the obtained data in Table 1 was measured from the front and rear sides of the phantom after the radiation source was attached to the contamination positions 301~314 on the front side of the humanoid phantom.

The rear side among the obtained data in Table 1 was measured from the front and rear sides of the phantom after the radiation source was attached to the contamination positions 315~328 on the front side of the humanoid phantom.

TABLE 1

| Measurement mode of Whole body measuring machine | Radiation source attached position | Cobalt-60 | Cesium-137 |
| --- | --- | --- | --- |
| Whole body | Front | 8.3 | 13.4 |
|  | Rear | 7.7 | 12.4 |
| Thyroid gland | Front | 8.8 | 14.2 |
|  | Rear | 6.5 | 11.0 |
| Lung | Front | 9.3 | 15.2 |
|  | Rear | 6.7 | 10.6 |
| Abdominal region | Front | 8.9 | 14.0 |
|  | Rear | 7.1 | 11.4 |
| Average |  | 7.9 | 12.8 |
| Standard deviation |  | 1.1 | 1.7 |

The experimentation results of the radioactivity contamination of the internal parts of the body are as shown in Table 2. In Table 2, when the radiation source was Cobalt-60, the average of the defined rate was 1.5±0.1, and when the radiation source was Cesium-137, the average of the defined rate was 1.5±0.0

The obtained data in Table 2 was measured after Cobalt-60 and Cesium-137 was attached at the inner side of the humanoid phantom.

TABLE 2

| Measurement mode of Whole body measuring machine | Radiation source attached position | Cobalt-60 | Cesium-137 |
| --- | --- | --- | --- |
| Whole body | Internal | 1.4 | 1.5 |
| Thyroid gland | Internal | 1.4 | 1.5 |
| Lung | Internal | 1.5 | 1.5 |
| Abdominal region | Internal | 1.5 | 1.5 |
| Average |  | 1.5 | 1.5 |
| Standard deviation |  | 0.1 | 0.0 |

Equations for determining whether or not the internal parts or external parts of the radioactivity detection target's body have been contaminated by radioactivity based on the results of Table 1 and Table 2 are as follows.

In case in which the internal parts of the radioactivity detection target's body have been contaminated, $$\text{Maximum value(front or rear portion)/minimum value (front or rear portion)} \leq 1.5 \quad (1)$$

In case in which the external parts of the radioactivity detection target's body have been contaminated, $$\text{Maximum value(front or rear portion)/minimum value (front or rear portion)} > 1.5 \quad (2)$$

Table 1 and Table 2 show merely the results of experimentation performed for the sake of the present invention.

In another embodiment, a ratio obtained by dividing a larger value among the radioactivity values detected from the corresponding portions by a smaller value may be set to 1.5 as a reference for determining whether or not the internal parts or external parts of the radioactivity detection target's body have been contaminated, and when the rate is greater than 1.5, it may be determined that the external parts of the radioactivity detection target's body have been contaminated, and when the rate is smaller than 1.5, it may be determined that the internal parts of the radioactivity detection target's body have been contaminated.

As stated above, a means for setting radioactivity values by the difference in distances according to the chest size, waist measurement, hip size, and the like, of the detection target and obtaining a contamination degree by using radioactivity values according to distances, set values for determining whether or not the internal parts or external parts of the body have been contaminated by radioactivity, and the radioactivity values detected from the mutually corresponding portions may be stored in the database or memory so as to be selectively used as necessary.

According to an exemplary embodiment of the present invention, whether or not the internal parts or external parts of the body of a detection target have been contaminated by radioactivity can be recognized by using the characteristics that external radioactive material is detected to have a higher value than that of an internal radioactive material because the radioactive material put on the external surface of the body is closer to a radioactivity detection unit than the radioactive material present in the body is, does not have a shielding effect by an internal material, and its detected radioactivity value is reduced to be inverse proportional to the square of the distance.

According to another exemplary embodiment of the present invention, the radioactivity detection units are installed at upper, lower, left and right portions or upper and lower parts of the apparatus to detect radioactivity simultaneously or separately and compare detected radioactivity values such that values detected from the upper front and rear portions are compared, values detected from upper left and right portions are compared, and also values detected by the lower radioactivity detection units are compared in the same manner, to thus easily recognize whether or not the internal parts or external parts of the body of a detection target have been contaminated by radioactivity.

According to another exemplary embodiment of the present invention, a set value stored in a memory for determining a radioactivity contamination of the internal parts or external parts of a body in a case in which a ratio according to the difference in a radioactivity detection value of a comparison target is 1.5 times or greater, and when a radioactivity detection value of a comparison target is greater than the set value, it is determined that the external parts of the body of the comparison target have been contaminated.

According to another exemplary embodiment of the present invention, when two values are determined to be generated by the difference in distance of the front, rear, left and right portions of the body based on radioactivity values detected by detection units installed at front, rear, left, and right portions of the upper and lower parts of the radioactivity whole body detection apparatus and detected positions, it is determined that the external parts of a body have been contaminated and the measured radioactivity values and detection positions are precisely displayed on a display unit of the radioactivity whole body detection apparatus, to allow the detection target to easily separate and remove the contaminated radioactive material.

According to another exemplary embodiment of the present invention, when it is determined that the internal parts of the body have been contaminated by radioactivity based on the set value 1.5 stored in the memory, mutually corresponding comparison target radioactivity values are added up and then averaged to thereby preciously detect the radioactivity values and the detected positions and display the same on a display unit.

According to another exemplary embodiment of the present invention, the radioactivity whole body detection apparatus is divided into upper and lower parts, the upper and lower parts are divided into front, rear, left and right portions, respectively, a radioactivity detection unit is installed at each of the front, rear, left and right portions, radioactivity values detected by each of the radioactivity detection units are compared and analyzed such that radioactivity values of the front and rear portions of the detection target detected by the radioactivity detection units positioned at upper front and rear parts are compared, radioactivity values detected by the radioactivity detection units positioned at upper left and right parts are compared, and also radioactivity values detected by the lower radioactivity detection units are compared in the same manner, thus determining whether or not the internal parts or external parts of the detection target's body have been contaminated by radioactivity, and therefore, the industrial applicability is very high.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for detecting a radioactivity contamination of internal parts and external parts of a whole body, the method comprising:
   receiving a whole body within a radioactivity whole body detection apparatus via an entrance or a door installed at one side of the radioactivity whole body detection apparatus;
   measuring radioactivity values of the whole body by radioactivity detection units installed on the front, rear, left, and right portions of the radioactivity whole body detection apparatus, wherein the radioactivity detection units are fixedly installed to be long in a vertical direction on the front, rear, left, and right portions of upper and lower parts of the radioactivity whole body detection apparatus as upper detection units and lower detection units, respectively; and
   determining whether or not a detection target of the whole body has been contaminated by radioactivity based on the radioactivity values detected by the detection units, wherein the upper detection units compare radioactivity values detected from the front and rear portions and compare radioactivity values detected from the left and right portions, and the lower detection units compare radioactivity values detected from the front and rear portions and compare radioactivity values detected from the left and right portions in the same manner to thereby determine whether or not the internal parts or external parts of the body have been contaminated by radioactivity.

2. The method of claim 1, wherein when the radioactivity detection units compare the radioactivity values detected from the front, rear, left, and right portions of the upper and lower parts, a rate obtained by dividing a larger value among the detected radioactivity values by a smaller value is set between 1.8 and 2.2 as the reference for determining whether or not the internal parts or external parts of the body have been contaminated by radioactivity, and when a detected radioactivity value is higher than the set value, it is determined that the external parts of the body have been contaminated by radioactivity, and when a detected radioactivity value is lower than the set value, it is determined that the internal parts of the body have been contaminated by radioactivity.

3. The method of claim 2, further comprising, when it is determined that the internal parts of the body have been contaminated by radioactivity, adding radioactivity values detected from the front, rear, left and right portions, which mutually correspond to each other, of the upper and lower parts of the radioactivity detection units; and obtaining a radioactivity value by averaging the added value.

4. The method of claim 2, further comprising inputting bodily conditions of the chest size, waist measurement, and hip size of the radioactivity detection target, and when the difference between two values based on radioactivity values detected simultaneously or separately by detection units installed at the front, rear, left, and right portions of upper and lower parts is determined to be a value generated by the difference in distances of the inputted bodily conditions, it is determined that the external parts of the body have been contaminated by radioactivity.

5. The method of claim 1, further comprising interrupting an introduction of gamma rays to shield the external parts of the radioactivity detection units to thereby shield nearby natural radial rays to prevent gamma rays from being introduced into the radioactivity whole body detection apparatus from the exterior.

* * * * *